Oct. 27, 1964   J. S. FLORIN   3,154,117
METERING DEVICE
Filed Aug. 21, 1961   5 Sheets-Sheet 1

INVENTOR.
JAMES S. FLORIN
BY
Moore, White & Burd
ATTORNEYS

INVENTOR.
JAMES S. FLORIN

Oct. 27, 1964
J. S. FLORIN
3,154,117
METERING DEVICE
Filed Aug. 21, 1961
5 Sheets-Sheet 3
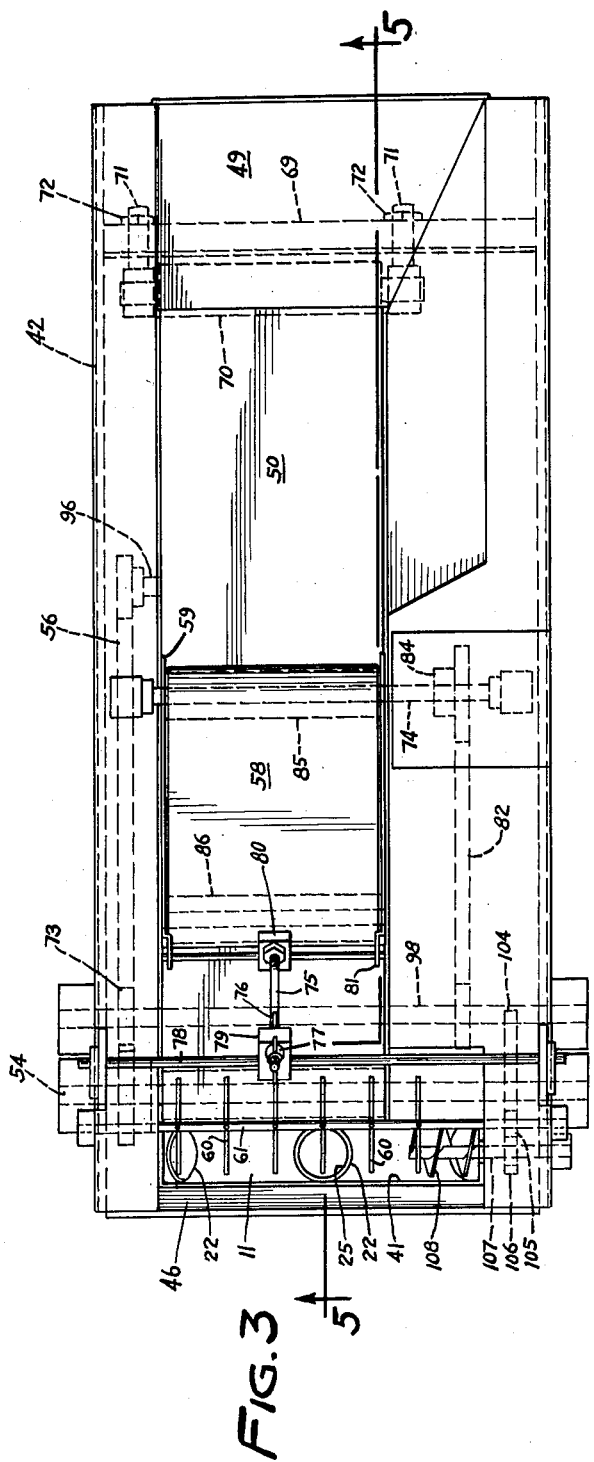
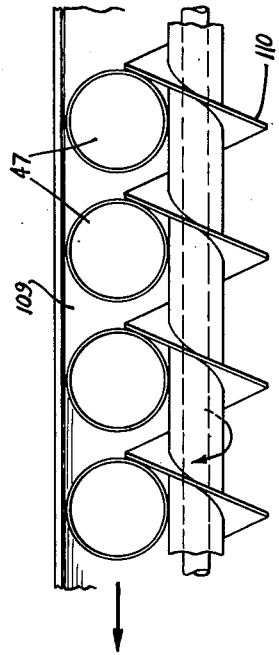
INVENTOR.
JAMES S. FLORIN
BY Moore, White & Burd
ATTORNEYS Oct. 27, 1964   J. S. FLORIN   3,154,117
METERING DEVICE
Filed Aug. 21, 1961   5 Sheets-Sheet 4

INVENTOR.
JAMES S. FLORIN
BY
Moore, White & Burd
ATTORNEYS

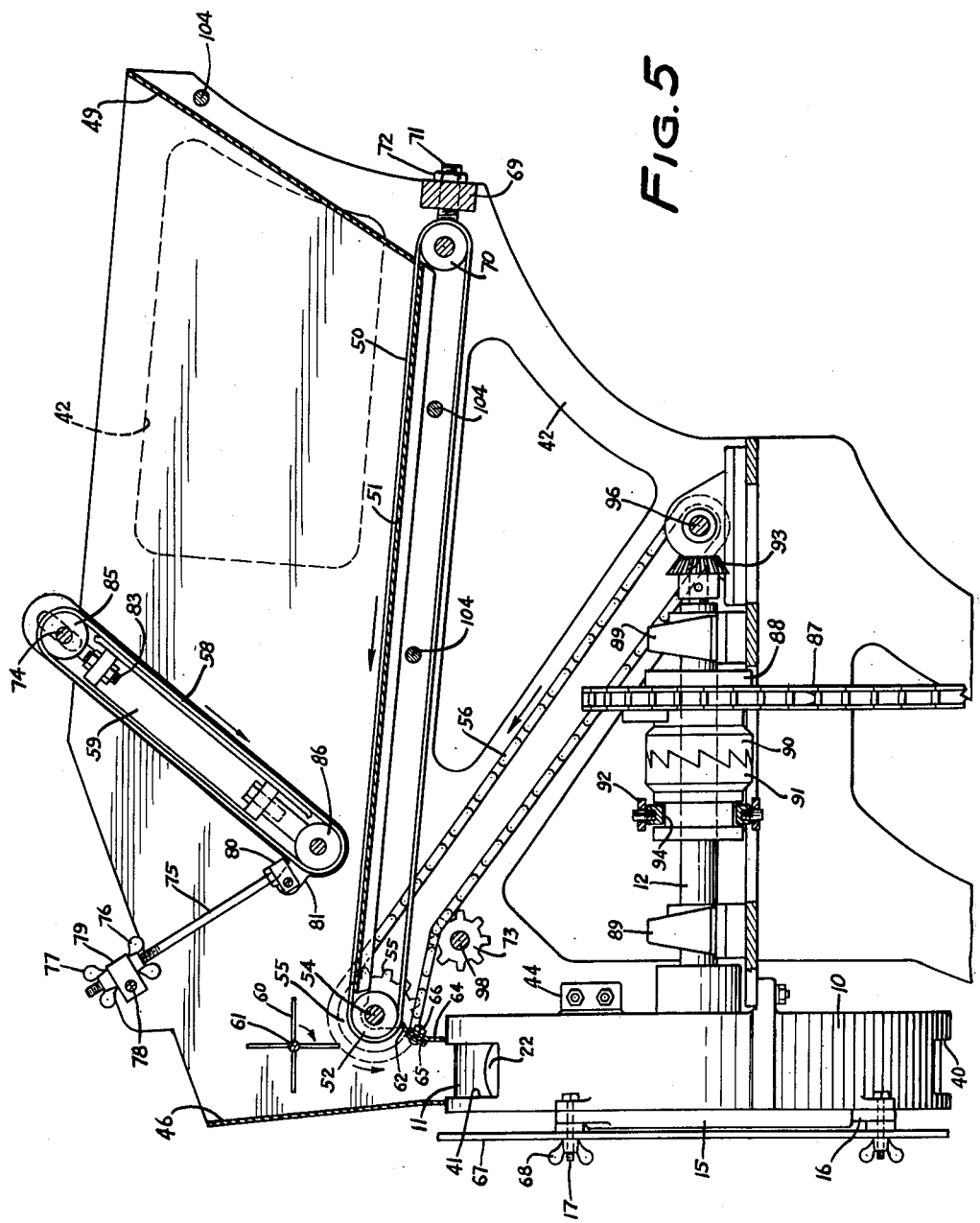

United States Patent Office 3,154,117
Patented Oct. 27, 1964

3,154,117
METERING DEVICE
James S. Florin, Le Sueur, Minn., assignor to Green Giant Company, Le Sueur, Minn., a corporation of Minnesota
Filed Aug. 21, 1961, Ser. No. 132,768
11 Claims. (Cl. 141—144)

This invention is a novel metering device for metering out quantities of material in consecutive substantially equal amounts as for example in the process of filling cans. It incorporates a novel vertical filling and metering arrangement which features pistons that are cam and spring operated to measure the quantities of materials being inserted and expelled. Incorporated with these pistons are adjustable sleeves or hollow pistons that move with and are part of the pistons in action but which may also be adjusted with respect to the pistons.

The invention also includes novel feed structure, from the hopper to the actual metering structure, which adapts it to handling non-free flowing materials in a consistent and efficient manner. An anti-bridging device is also incorporated in the vertical metering and filling unit.

While this device was invented to solve the problems encountered in adding small quantities of a secondary material to cans principally filled with a different material, it is clear also that it may serve as a primary metering device. As non-free flowing material may be metered effectively with this device, it may be used to advantage in many circumstances not specifically described herein.

In the food canning industry, it is often desirable to add small quantities of one kind of food to a can principally filled with a different kind of material. The particular problems for which this machine was invented as a solution are those of adding small onions to cans of peas and adding a mixture of peppers of various kinds and other seasoning materials to cans of corn. Both of these additives tend to be non-free flowing and bridge easily. For this reason, it is difficult, to the point of impracticality, to use any conventional filling structure to handle this filling problem at least in the form of a separately metered additive. Consequently, the techniques previously employed for placing these materials in the can were unsatisfactory.

In the case of the corn to which the peppers and other flavoring materials were added, the procedure was to add to a large hopper containing the corn, a proportionate amount of the added materials which were then mixed with the corn thoroughly and placed in the cans as a complete load. While this means of adding pepper produces reasonably consistent can filling and is rather satisfactory from that point of view, it requires the can filling machinery to be used in a rather inflexible manner. In other words, it is necessary to run an entire fill of any one type of corn, whether plain or with the additive, before changing. When switching from the corn, to which the peppers were added, to the plain corn, the entire plant had to be thoroughly washed down in order to avoid stray pieces of pepper, etc., getting into the plain corn.

In the case of the onions, however, the problem was not solved even this satisfactorily, because the onions are quite delicate and any attempt to mix them thoroughly with the peas prior to canning caused them to be broken up and lose their attractive appearance. Consequently, the filling of the cans containing peas and small onions was a rather difficult one to solve, resulting in considerable hand effort in keeping the materials flowing in the hopper for example, and preventing the cans from being irregularly filled. In spite of these efforts, considerable irregularity resulted.

Accordingly, it is an important object of this invention to provide a metering device that will handle non-free flowing materials consistently and rapidly.

A further object of this invention is to provide a metering device in which the metering structure operates in a vertical plane rather than in a horizontal plane.

It is yet another object of this invention to provide a metering device which can handle small quantities of materials consistently and accurately.

A still further object of this invention is to provide a metering device that can be of reduced size so as to adapt it to fit into major filling structures in a minimum of space.

Yet another object of this invention is to provide a metering device of simple structure of adjustable metering capacity.

A still further object of this invention is to provide a novel metering device, having a hopper from which materials are fed by a pair of converging moving belts, and incorporated rotating finger structure to provide for consistence and even feeding of the materials from the belt into the filling area.

A still further object of this invention is to provide a metering device having spring and cam operated pistons functioning in cups formed in a wheel that rotates in a vertical plane.

It is yet another object of this invention to have the pistons include hollow cup-like structures which are longitudinally adjustable with respect to the pistons and moved therewith, thereby providing a cup filling and discharging means that operates in a consistent manner.

A further object of this invention is to provide a metering device having metering structure that employs inertia to effect consistent metering of non-free flowing materials.

Yet another object of this invention is to provide a metering device having a control structure, readily adapted to either manual or automatically controlled filling assembly lines.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 3 is a plan view of the device with broken lines illustrating hidden parts;

FIGURE 4 is drawn to a scale substantially larger than the scale used in FIGURES 1, 2 and 3; broken lines illustrate hidden parts;

FIGURE 5 is a longitudinal section taken on the line 5—5 of FIGURE 3 and drawn to the same scale as FIGURES 1, 2 and 3; broken lines illustrate hidden parts; and FIGURE 6 is a fragmentary plan view of a suitable can feeding mechanism illustrating how the cans may be conveyed past the metering device in a consistent manner.

Figure 1:
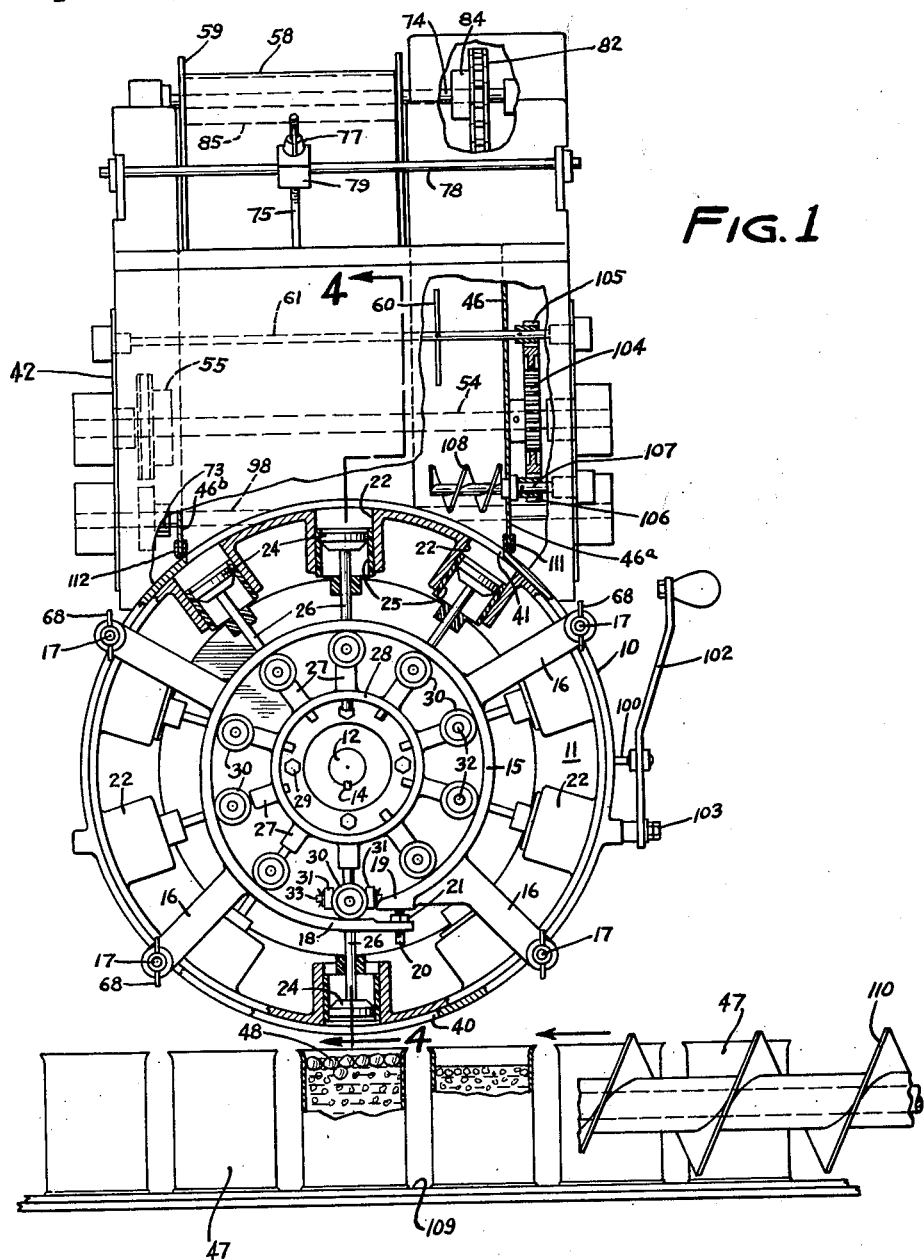
FIGURE 1 is a front elevation of the invention with portions thereof broken away to illustrate its construction more clearly; broken lines illustrate hidden parts.

Referring to the drawings, and particularly to FIGURE 1, the metering mechanism will be seen to comprise a ring 10 which is fixed to the frame of the machine and is stationary. Inside of ring 10 is a movable or rotating wheel 11 which is fixed to shaft 12 by any suitable means such as key 14. Also fixed to the machine frame is the cam ring 15 which is supported by arms 16 extending out and engaging the studs 17 and securely held thereon by suitable means. Cam ring 15 is substantially rigid except for its end 18 which has a yielding or spring-like quality to it.

The relationship of the end 18 of cam ring 15 may be adjusted with respect to the end 19 to regulate the amount of drop in the cam by means of screw 20 threaded into end 18 and engaging the end 19 of ring 15. By screwing this adjustment toward end 19, end 18 of cam ring 15 is moved farther away from end 19. A suitable jam nut as at 21 retains the adjustment made.

Movable ring 11 is provided with a series of cups or cylinders 22 within which the pistons 24 are movably mounted. Hollow pistons 25 embrace pistons 24 and are adjustably secured to piston rods 26. Hollow pistons 25 slidably engage the inside of cups 22 to support the upper ends of the pistons. The ends of the piston rods 26 extend down and slidably engage the bearings 27 secured to an inner ring 28 which is rigidly attached to wheel 11. Any suitable attachment means such as cap screws 29 may be used to secure ring 28 to ring 11.

Each of the piston rods 26 carries a roller 30 which rides on the inside of cam ring 15. When the cam ring is relatively closer to ring 28, the pistons 24 are withdrawn within the cup 22 as shown at the upper portion of the ring 11 in FIGURE 1. When the rollers 30 drop off the end 19 of cam ring 15, however, the pistons are extended to expel material in the pockets 22 as shown at the bottom of the ring 11 in FIGURE 1. Rollers such as those shown at 31 (FIGURES 1 and 4) hold the piston rods in such a position that the rollers 30 will ride on the cam ring 15. Only one pair of rollers 31 is shown in FIGURE 1, but they are provided for each piston assembly.

Figure 4:
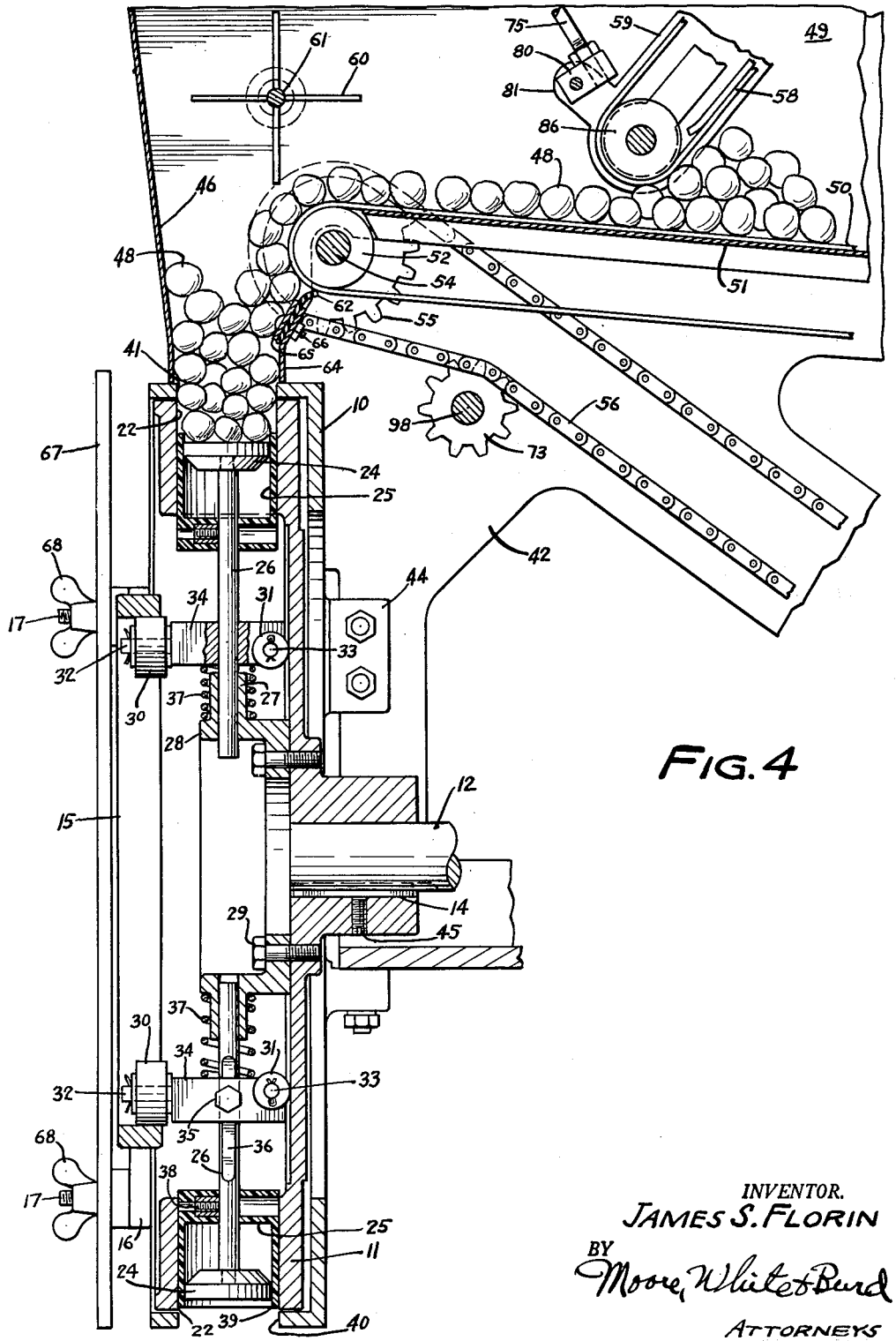
FIGURE 4 is a vertical section of the metering and feeding mechanism taken on the line 4—4 of FIGURE 1.

Turning now to FIGURE 4 the rollers 30 and 31 will be seen supported rotatably on stub shafts 32-33 respectively secured to cross bar 34. The latter is adjustably secured to piston rod 26 by suitable means such as the set screw 35 which engages a flattened portion 36 of the piston rod 26. By loosening set screw 35, piston rod 26 may be adjusted relative to cross bar 34 which will cause the piston 24 to have a variety of terminal positions with relation to the pocket 22. Hollow piston 25, however, is accordingly readjusted to have its original terminal positions. Springs 37 yieldingly urge the cross bars 34, and of course the piston rods 26 which are secured thereto, away from the inner ring 28. These springs are not shown in FIGURE 1, because of the relatively small scale to which that figure is drawn.

Hollow pistons 25 are adjustably secured to the piston rod 26 by suitable means such as set screw 38. It is this set screw that permits repositioning hollow pistons 25 in relation to the pistons 24 as to retain its terminal positions as shown in FIGURE 4, regardless of the position of cross bar 34 on piston rod 26. This repositioning of hollow pistons 25 is accomplished as explained below.

When set screw 35 is released and piston 24 withdrawn upward, as viewed at the bottom of FIGURE 4, in order to increase the amount of material that can be taken into pocket 22, the hollow pistons 25 are readjusted with respect to the piston rod by releasing set screw 38 so that the outer edge 39 of the hollow piston comes very close to the outer edge of the rotating ring 11 when the cam follower roller 30 has just dropped off the end 19 of ring 15. The possibility of so readjusting the piston 24 and hollow piston 25 is important to the operation of the device as will be explained in detail under operation.

As may be seen in both FIGURES 1 and 4, there are openings as at 40 at the bottom, and 41 at the top of ring 10 for the purpose of allowing the material to be ejected at the bottom and received at the top respectively.

As shown clearly in FIGURE 4, ring 10 is rigidly secured to frame 42 by suitable means such as the bracket 44. The key 14 is suitably retained to provide connection between shaft 12 and ring 10 by a suitable means here shown as set screw 45.

As seen in FIGURE 4, there is a filling compartment 46 directly above the ring 10 and wheel 11 into which material is conveyed that it is desired to put into the cans such as those designated 47 in FIGURE 1. In FIGURE 4, small onions that are added to peas are illustrated at 48. These small onions are contained in a hopper 49 and are conveyed into the filling compartment 46 by suitable means such as the endless belt 50 which slides over the bottom 51 of hopper 49. Endless belt 50 is suitably driven by a roller 52 mounted on the shaft 54 which is fixed to sprocket 55. An endless chain as at 56 is the means for connecting sprocket 55 to a power source.

A second endless belt 58 is supported by a suitable framework 59 above the flow of materials on belt 50 and aids in forcing material 48 out along the belt 50 to the filling compartment 46 but at the same time limits the amount of material that will feed out along belt 50 at any given instant. A series of raking fingers 60 are secured to a rotatable shaft 61, which fingers pick material 48 off belt 50, as it approaches feeding compartment 46, to prevent large quantities of the material from being suddenly dropped into compartment 46 to avoid packing therein.

As is clearly shown in FIGURE 4, material in compartment 46 drops by gravity into the cups 22 in wheel 11. FIGURE 1 shows how such material is carried by the cups in metered quantities around the ring 10 and to the exit 40 at the bottom thereof.

At the back part of the compartment 46 a suitable scraper such as the resilient blade 62 is suitably supported as by being clamped between flange 64 and clamp plate 65. Suitable nut and bolt assemblies 66 hold the clamp plate to the flange 64. Scraper blade 62 bears lightly on belt 50 and prevents materials from being carried back along the underside of belt 50 on its return trip.

It is desirable to have a cover plate such as the one designated 67 covering over the mechanism of the ring 10 and wheel 11 and this cover plate may be suitably supported on the studs 17 by means of the wing nuts 68. By thus holding the cover plate 67 over the mechanism of the two wheels, the cover may be easily removed if necessary for adjustment or repairs.

As shown in FIGURE 5, frame 42 extends back under the entire hopper mechanism and provides a suitable support as at 69 for the rear roller 70 supporting the rear end of endless belt 50. An adjustable means as at 71 secured to jam nut 72 provides means for achieving and retaining the operating tension on belt 50.

Frame 59, which supports the endless belt 58, is pivotally mounted as at 74 so that the entire frame may be moved to and from endless belt 50 by suitable means such as the support rod 75. This rod has a pair of butterfly nuts 76 and 77 by means of which its effective length may be adjusted with respect to the lower end of frame 59 and the cross support 78. Cross support 78 is embraced by block 79 through which rod 75 actually extends and against which the butterfly nuts 76 and 77 react to adjust the effective length of rod 75. By loosening butterfly nut 77 and tightening 76, the clearance is decreased between the belts 50 and 58. A reverse procedure increases the clearance. The lower end of rod 75 is secured to appropriate block and rod assembly 80 which is pivoted to the frame 59 by extending through pierced ears such as that shown at 81. A chain 82 in FIGURE 1 engages the sprocket 84 mounted on shaft 74 and drives the endless belt 58. A roller 85 supports the upper end of endless belt 58 while an idler roller 86, FIGURE 4, supports the lower end thereof. Frame 59 may be moved in the direction of belt 50 and away from roller 85 by suitable screw adjustment as at 83 to provide operating tension on belt 58, as seen in FIGURE 5.

The entire mechanism is driven by means of a chain 87 which is powered by a sprocket driven by a power source (neither of which are shown) and in turn drives a sprocket 88 that is rotatably mounted on shaft 12. Shaft 12 itself is journalled in suitable pillow block supported bearings 89 and is, of course, connected to the rotating wheel 11 as described above. The sprocket 88 is secured to a shear pin to one portion 90 of a dog-type clutch arrangement. The other portion 91 of the dog-type clutch arrangement is keyed to shaft 12 for rotation therewith but slidable thereon. A suitable yoke 92 and bearing member 94 serves to provide a means for sliding dog member 91 to and from dog member 90. When the dogs are engaged as shown in FIGURE 5, power is being transmitted to shaft 12 from the power source via the chain 87, sprocket 88 and the clutch arrangement.

Figure 2:
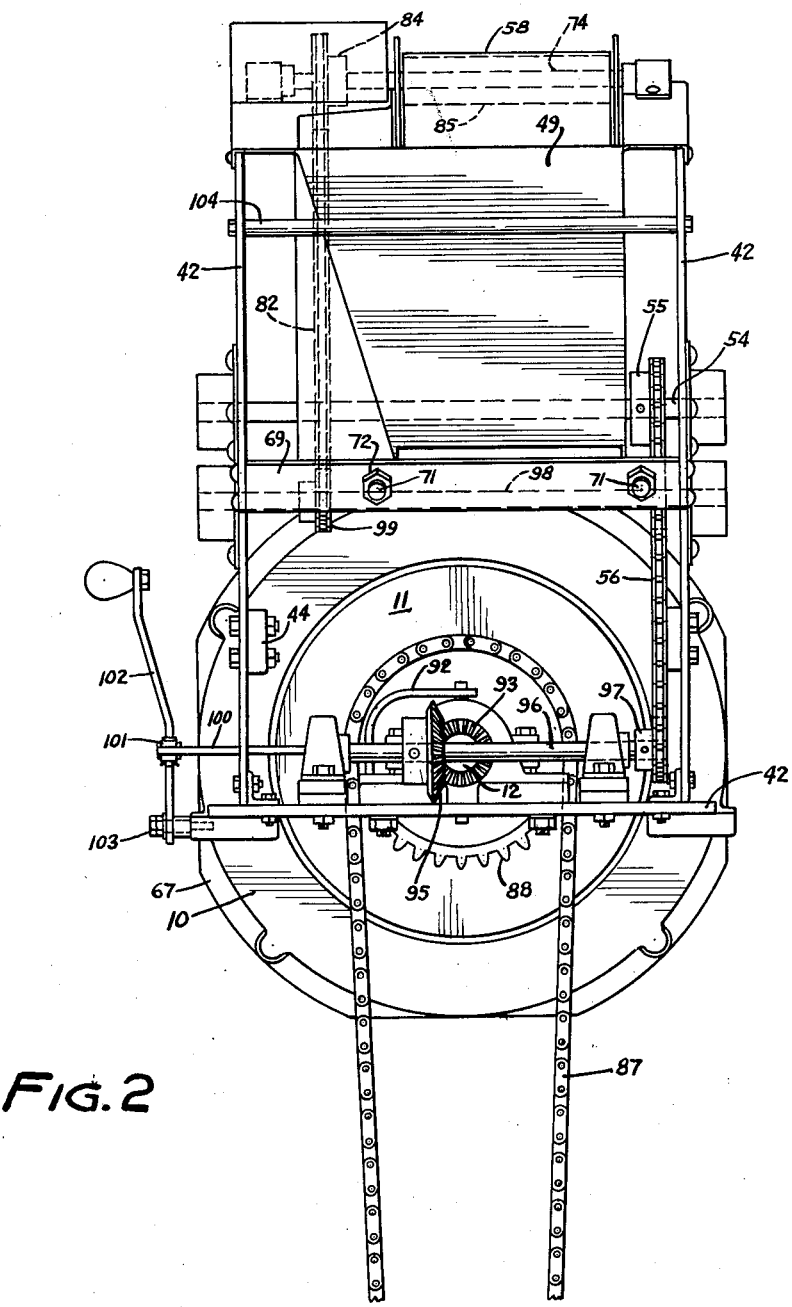
FIGURE 2 is a rear elevation of the device in which broken lines illustrate hidden parts.

A suitable gear arrangement such as bevel gears 93 transmits power from shaft 12 to shaft 96 which carries a sprocket 97 in FIGURE 2. Chain 56 is reeved around and is driven by sprocket 97.

As shown in FIGURE 5, chain 56 also drives sprocket 73 which is mounted on shaft 98. Shaft 98 is journalled in bearings mounted on frame 42 and extends across to a sprocket 99 around which chain 82 is reeved and transmits power to operate belt 58, as seen in FIGURE 2.

A link 100, as seen in FIGURE 2, connects yoke 92 to a clevis link 101 that is secured to a clutch control handle 102 which is pivoted to ring 10 at 103. Link 100 is pivoted to the frame so that moving control handle 102 forward causes the yoke 92 to carry clutch member 91 rearward to engage the dog member 90. Rear movement of handle 102 disengages the clutch.

Referring now again to FIGURE 1, the shaft 54 carries roller 52 to transmit power to the endless belt 50. Shaft 54 also has, remote from its end driven by chain 56, a large gear designated 104. Gear 104 meshes with a smaller gear 105 on shaft 61 which drives the rake assembly. Another small gear 106 also meshes with gear 104. Gear 106 is fixed to the stub shaft 107 carrying the flighting 108. The purpose of flighting 108 is to prevent the material 48 from piling up against wall 46a of filling compartment 46. Material 48 that is in engagement with wheel 11 via opening 41 and which does not immediately enter pockets 22 tends to be carried over to the wall 46a of compartment 46. Shaft 107 rotates in a direction and the flighting 108 thereon is such as to convey material 48 back away from wall 46a to prevent a build-up and bridging of materials in that area. Materials to be metered are, therefore, concentrated near the center of opening 41 in ring 10 so that they will fall by gravity into pockets 22 and fill the pockets regularly and consistently. A similar flighting may be employed adjacent wall 46b if bridging becomes a problem at that point. As shown in FIGURE 1, a series of cans 47 rest on a conveyer table 109, which is provided with suitable means for moving the cans past ring 10 in timed relation to the rotation of wheel 11. A suitable means is the flighting 110 as shown in fragment in FIGURE 1 and more specifically in FIGURE 6. This flighting 110 is keyed to the rotation of the wheel 11 suitably so that a can is advanced as each pocket 22 is presented to opening 40 and forced clear of its contents by the downward thrust of piston 24. This can conveying means is well known and hence not shown and described in detail. It is shown illustratively to disclose the combination of this filling means with a can advancing means to which the operation of the filling means is keyed or timed. The lower edges of walls 46a and 46b of compartment 46 where they approach the upper surface of ring 10 are provided with sealing members as at 111 and 112 respectively.

*Operation*

To prepare the device for operation, the rate of feed control belt 58 is adjusted by means of the wing nuts 76–77 until the clearance between the lower end of belt 58 and the top of belt 50 is the desired one. Hopper 49 is then filled with the material to be metered and the compartment 46 may be given an initial charge in order to make sure that the device begins filling cups 22 immediately. With the power on, the control arm 102 is moved to the engaged position so that the clutch dogs 90–91 engage each other and shaft 12 is rotated, thereby driving all the mechanisms of the metering device. As cups 22 are presented to opening 41, the material 48 fills the cups as shown in FIGURE 4 and the filled cups slide past the end of opening 41 and are held in filled condition by the interaction of rings 10 and 11. As the first full cup 22 approaches the opening 40, the handle 102 may be disengaged until such time as the cans 47 are approaching the discharge opening 40. With the approach of the first can 47, clutch arm 102 is again engaged and the wheel 11 begins rotating again. When a can begins to assume a position below the opening 40, a portion of the material in cups 22 will probably drop into the can by gravity, as the cam follower roller 30 is still retained by the end 19 of the cam ring 15 briefly while the cup 22 has already begun to coincide with the opening 40.

With a direct alignment of a can below a cup, however, the cam follower 30 is carried past the end 19 of cam ring 15 and spring 37 forces the piston rod 26 downward with a sudden movement expelling at least a substantial portion of the material in the cup. The downward movement is suddenly stopped by the engagement of cam follower 30 with the end 18 of the cam ring 15. The sudden jolt of the stopping of piston rod 26 and, therefore, piston 24–25 causes the inertia generated in the material to complete ejection of the material from the pockets 22. Furthermore, even though piston 24 does not completely extend to the edge of wheel 11, the movable hollow piston 25 which is secured to the piston rod 26 nearly does, thus cleaning the walls of cup 22. It is the combined inertial and direct cleaning action of the piston 24 and hollow piston 25 respectively that provides consistent metering of non-free flowing material.

Thus, even if piston 24 were adjusted toward ring 23 so that it was near the bottom of hollow piston 26 in order to allow the cup 22 to accept an extraordinarily large charge of material, there would still be positive cleaning of walls of cup 22 by hollow piston 25 and inertial dumping of material between the outer edge 39 of hollow piston 25 and the face of piston 24. Actually hollow piston 25 is slightly withdrawn from the outer edge of cup 22 so that there is no possibility of the hollow piston 25 being engaged by ring 10 as wheel 11 rotates. As the wheel 11 continues to rotate, cam follower 30 riding on cam ring 15 gradually withdraws the piston 24 and the hollow piston 25 into cup 22 until at the top of ring 10 at the beginning of opening 41, the piston and hollow piston are fully withdrawn as shown in FIGURE 1.

In the meantime the materials are constantly being fed into compartment 46 from hopper 49 by the rotation of belts 50 and 58. The rake fingers 60 being rotated rapidly by shaft 61 are assuring that the material flows more or less evenly from the belt 50 into the compartment 46 rather than falling off in larger agglomerations which it would otherwise tend to do, which would cause the material to pack and bridge. Material is being picked off belt 50 constantly by rake 60 and is separated and resists packing and bridging better than it would if merely allowed to fall off belt 50 by gravitational pull. In this connection, it should be noted that gear 104 is substantially larger than gear 105 and consequently shaft 61 is rotating at relatively high speed compared with the rate of movement of belt 50.

The shaft 107 driven by gear 106 rotates at about the same speed as the shaft 61 does, because it is also driven by a small gear meshing with the large gear 105. Flighting 108 is rotated in such a manner as to constantly force any materials in compartment 46 back up toward the center of the opening 41 even though the compartment is actually open to the very edge of the wall supporting the flighting 108 and is sealed by the flexible seal 111.

While the principal filling takes place with the cups 22 in the vertical position, it is desirable to have material presented to the cups 22 throughout the extension of opening 41. It should be remembered that in a high speed machine, more than three hundred cans a minute may be passing opening 40 where the fill is added. At a rate of speed like this even though space 41 is fairly large, there is a relatively short period of time for the cups 22 to get completely filled. At speeds such as this or even close to three hundred cans per minute, some filling may occur even at the extreme right hand side of the compartment 46 as viewed in FIGURE 1.

Another unique feature of this particular device is the fact that the teeth on the dogs 90-91 are exactly equal to the number of pockets in wheel 11. Regardless of how the dogs engage each other, the mechanism always presents a cup 22 in precise alignment with a can 47. For this reason, lever 102 may be replaced by an automatic control of some kind related to the can feeding structure so that if no can is presented, the machine of this invention does not operate to discharge any material from the pockets 22.

By the employment of this auxiliary filling structure for placing additives in cans, the canning assembly line can be made completely flexible. It is possible to merely stop the additive metering device and run cans that contain no additive whenever such is desired. On the other hand, any time that it is desired to start placing additives in cans, the control 102 may merely be re-engaged and the assembly line will start to produce cans containing additives.

While the structure has ben disclosed as solving a problem of placing additive in cans, it is perfectly clear that the same structure on a larger scale could be used to fill cans completely. Furthermore, by use of the hollow piston 25 in conjunction with the movable piston 24, the amount of charge that the machine will deliver can be controlled very readily and adjusted quickly and easily to accommodate the cans of different size. Furthermore, since the metering structure operates in a vertical plane, it is possible for the cans to move past the filling opening 40 at a substantial rate of speed and still achieve complete discharge of the pocket 22. In actual operation when cans are flowing past this machine at a substantial rate of speed such as from 300 cans a minute on up, the movies taken of the machine in operation disclose that the materials start falling into the can at the very beginning of opening 40 and that the final materials fall into the can even after the cans are past the precise alignment position shown in FIGURE 1, where a can and cup are both shown broken away with the can directly below the cup. For this reason, substantially higher rates of speed and less can filling line space is required for this metering mechanism than is true when the cans are filled by a horizontally operated filling mechanism. With a horizontal mechanism, it is necessary to carry the can for a substantial distance under the filling mechanism in order to provide material ejecting capability equal to that provided by straight travel under this vertical structure.

When the invention is used with food materials as disclosed here, all of the parts which engage the food must be made of some material that is readily kept clean, etc. In the instant disclosure, therefore, all of the wheels and pistons and other novel parts that actually contact the material being loaded, except the belts, seals and hollow pistons, are preferably formed from stainless steel or some similarly easily cleaned non-corrosive material. The hollow sleeves 25 have been found most satisfactorily made from a suitable non-metallic material such as No. 31 nylon or the like which has adequate strength density and dimensional stability to function well.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A metering device for placing material into cans including a rotating metering wheel having pockets that are filled from a filling compartment which is supplied with material from an improved hopper, the improvement comprising, an endless belt forming the effective bottom of said hopper, a second endless belt forming the end wall of said hopper, said second endless belt being pivoted near its upper end to said hopper, adjustable length means secured to said hopper and the lower end of said second endless belt, and means for driving both of said endless belts whereby their adjacent surfaces are moving in the same direction.

2. The metering device of claim 1 in which a raking structure is movably secured near said hopper above the discharge end of the endless belt forming the effective bottom of said hopper.

3. A can filling metering device comprising, the combination of means for moving cans past a given point at regularly spaced intervals, a frame mounted adjacent said point on said can moving means, a wheel rotatably secured to said frame for rotation in a vertical plane and positioned over said point, cups formed within said wheel, pistons movably secured within said cups for retraction at the top and extension at the bottom of said wheel, means for filling said cups at the top of said wheel, means for retaining the fill placed in said cups at the top of said wheel until said cups are near the bottom of said wheel, and means for rotating said wheel in timed relation to said moving can means to bring cans and cups to said point simultaneously, said means for rotating said wheel in timed relation to said can moving means comprising a common power source, a dog-type clutch one-half of which is connected to said common power source and the other half of which is connected to said wheel, each half of said dog-type clutch having teeth thereon equal in number to the cups of said wheel.

4. A can filling metering device comprising, the combination of means for moving cans past a given point at regularly spaced intervals, a frame mounted adjacent said point on said can moving means, a wheel rotatably mounted for rotation in a vertical plane on said frame and positioned over said point, cups formed within said wheel, pistons movably secured within said cups, means for retracting said pistons at the top and extending said pistons at the bottom of said wheel, means for filling said cups at the top of said wheel, means for retaining the fill placed in said cups at the top of said wheel until said cups reach the bottom of said wheel, a hopper secured to said frame adjacent said filling means, an endless belt forming the effective bottom of said hopper, a sub-frame pivoted to said hopper forming an end wall of said hopper, a second endless belt movably mounted on said sub-frame, adjustable length means secured to said hopper and the lower end of said sub-frame, and means for driving both of said endless belts whereby their adjacent surfaces are moving in the same direction.

5. The can filling metering device of claim 4 in which said means for filling is a compartment, anti-bridging means operatively mounted in said compartment, and means for associating said anti-bridging means with said endless belt driving means.

6. A metering device comprising, a vertical stationary ring having openings at the top and bottom thereof, a rotatable wheel slidably engaging the inside of said stationary ring, outwardly facing pockets formed in said wheel, pistons, having solid and hollow portions arranged in said pockets slidably, said solid portions within said hollow portions, said hollow portions having open, unobstructed ends facing the periphery of said wheel, resilient means urging said pistons away from the center of said wheel, a stationary cam ring arranged inside of said wheel, piston rods rigidly secured to the solid portions of said pistons and adjustably secured to the hollow portions of said pistons, cam followers movably secured to said piston rods and engaging said cam ring, pocket filling means above said vertical stationary ring, and means for rotating said wheel.

7. The structure of claim 6 in which there is pocket filling means above said vertical stationary ring top opening including, a filling compartment and anti-bridging flighting rotatably mounted in the wall of said filling compartment toward which the pockets of said rotatable whee move, said flighting being constructed to rotate so as to urge materials in the opposite direction to that which frictional engagement with the surface of said rotatable wheel moving past said filling compartment tends to move materials.

8. The metering device of claim 6 in which said hollow piston portions are made from a material having the characteristics of number 31 nylon.

9. A metering device comprising, a vertical stationary ring having openings at the top and bottom thereof, a rotatable wheel slidably engaging the inside of said stationary ring, cups formed in said wheel, pistons arranged in said cups slidably, resilient means urging said pistons away from the center of said wheel, each of said pistons having a piston rod, cam followers secured to said piston rods adjustably, means for rotating said wheel, a cam ring secured to said ring, said cam ring having a drop formed by overlapping ends one of which has a threaded opening in it, and a screw threaded into the opening of said cam ring end and engaging the other end of said cam ring; said cam followers engaging said cam ring.

10. The metering device of claim 9 in which each piston comprises a solid portion secured to said piston rod rigidly and a hollow portion secured to said piston rod adjustably.

11. A device for metering material including a means continuously moving and having material receiving pockets therein, a filling compartment positioned above said continuously moving means, means for feeding materials into said filling compartment in a controlled manner and an anti-bridging flighting means mounted in said filling compartment and extending from a portion of said filling compartment toward which materials in said filling compartment are frictionally moved by the movement of said continuously moving means past said filling compartment, said flighting being constructed to rotate so as to move materials in the opposite direction to that which they tend to be moved by the movement of said continuously moving means.

References Cited in the file of this patent
UNITED STATES PATENTS

| | | |
|---|---|---|
| 451,761 | Howland | May 5, 1891 |
| 618,717 | Nelson | Jan. 31, 1899 |
| 709,793 | McGinnity | Sept. 23, 1902 |
| 961,741 | Workman | June 14, 1910 |
| 1,892,627 | Pearson | Dec. 27, 1932 |
| 2,097,887 | Lacey | Nov. 2, 1937 |
| 2,444,155 | De Back | June 29, 1948 |
| 2,888,963 | Guyer | June 2, 1959 |

FOREIGN PATENTS

| | | |
|---|---|---|
| 689,695 | France | June 12, 1930 |
| 806,316 | France | Dec. 12, 1936 |